US 6,591,821 B1

United States Patent
Kong

(10) Patent No.: US 6,591,821 B1
(45) Date of Patent: Jul. 15, 2003

(54) VARIABLE VOLTAGE REGULATOR FOR ELECTRONIC ACCELERATOR IN AUTOMOBILE

(76) Inventor: Yong-Shik Kong, Haewoondae Jookong Apt., 407-503, 1278 Ja-Dong, Haewoondae-Gu, Busan, 612-774 (KR)

(*) Notice: Subject to any disclaimer, the term of this patent is extended or adjusted under 35 U.S.C. 154(b) by 0 days.

(21) Appl. No.: 10/063,790

(22) Filed: May 13, 2002

(51) Int. Cl.[7] .............................. F02P 3/04; F02P 15/00
(52) U.S. Cl. ...................... 123/633; 123/634; 123/651; 123/652; 307/10.1; 322/8; 322/33
(58) Field of Search ........................ 307/10.1; 123/633, 123/634, 651, 652; 322/8, 33

(56) References Cited

U.S. PATENT DOCUMENTS

| | | | | |
|---|---|---|---|---|
| 5,603,307 A | * | 2/1997 | Morita et al. ............... | 123/633 |
| 5,841,202 A | * | 11/1998 | Noguchi et al. ........... | 307/10.1 |
| 5,841,266 A | * | 11/1998 | Hikita et al. .................. | 322/8 |
| 6,137,247 A | * | 10/2000 | Maehara et al. ............ | 318/140 |
| 6,493,593 B1 | * | 12/2002 | Kamiya et al. ................ | 700/2 |

* cited by examiner

*Primary Examiner*—Bao Q. Vu
(74) *Attorney, Agent, or Firm*—Burns Doane Swecker & Mathis, LLP

(57) ABSTRACT

The present invention comprises an Electronics Control Unit (ECU) power potential stabilizing circuit and an ECU reference potential stabilizing circuit. The ECU power potential stabilizing circuit eliminates noise and stabilizes voltage variation occurring when the electrical parts of automobile are activated by the power supplied through the ECU of the electronic accelerator, by impressing it to the power supply line and variable voltage supply line. The ECU reference potential stabilizing circuit eliminates the unnecessary spark noise and harmonics noise occurring on the power supply line, reference potential line and variable voltage supply line, by impressing it to the variable voltage supply line and reference potential line. It further stabilizes the voltage supplied to the ECU by compensating the voltage fluctuated due to disturbances.

3 Claims, 2 Drawing Sheets

VARIABLE VOLTAGE REGULATOR FOR ELECTRONIC ACCELERATOR IN AUTOMOBILE

BACKGROUND OF INVENTION

1. Field of Invention

The present invention relates to a variable voltage regulator for electronic accelerator in automobile which is designed to stabilize the voltage supplied to the variable voltage controller of the accelerator in the electronicallyautomobile engine, which controls the power of the automobile by controlling the throttle valve with an electronics control unit (ECU).

2. Brief Description of Related Art

As disclosed in the official Patent Disclosure 97 (Jul. 22, 1997) for general automobile engines which controls a throttle valve with an ECU, voltage fluctuation ratio of the variable resister (13), whose resistive value varies according to the accelerator when the driver operates the accelerator, is inputted to the ECU and pulse voltage is created. When the said pulse voltage is transmitted to the solenoid control unit (15), the said solenoid control unit (15) activates the solenoid (16) with respect to the number of pulses. Then, it controls the amount of burning gas that flows in the engine so that the driver may produce maximum engine power efficiently.

In general, an automobile engine supplies electric power created from the generator to the battery and the battery distributes electric power to all electronic parts in the automobile.

As shown in FIG. 1, for automobiles that increase and decrease the engine power with the electronic accelerator, the power supply line (10) of the variable resister (13) and the reference potential line (11) are connected to both ends of the variable resister to maintain specific resisting value when the driver operates the accelerator. The voltage value of the said variable resister (13) varies according to the operation by the automobile driver, voltage varies due to the power supply line (10) connected to the ECU (14), the voltage varied at the variable voltage supply line (12) is supplied to the said ECU (14), the said ECU (14) recognizes the voltage and transmits the pulse signal to the solenoid control unit (15) and the said solenoid control unit (15) activates the solenoid (16) so that the driver may control the engine power by opening and closing the throttle valve (not depicted in the drawing) mechanically connected to the solenoid.

SUMMARY OF INVENTION

In the above electronicallyengine, although a fixed voltage shall be supplied to the variable resistance, the automobile is loaded with a higher overflowing lighting load than the rated current in such a case when the lights are on. This causes the voltage supplied to the generator or the battery to drop suddenly. This further causes electronic noise such as harmonics noise and spark noise to flow in the power of the control system of the automobile which uses a lot of electronic parts, relays and electronic control circuits that are composed of many electric parts and semiconductors.

The voltage supplied to the variable resistance of the accelerator varies according to the type of automobile, but fixed voltage of 5V or 12V is necessary so that the driver can control the engine power to the desired level. Otherwise, the power voltage supplied to the variable resistance of the accelerator fluctuates due to the electrical characteristics-of the aboveautomobile parts, the voltage between the ground and the reference potential fluctuates and unnecessary noise is created so that the engine does not operate according to the driver's intention. Further power control by the ECU is not stable. This will consequently increase the gas consumption in the engine, creating air pollution due to unstable combustion as well as decrease the riding comfort of the automobile.

To solve said problems in current automobiles, the present invention is directed to a variable voltage regulator for an electronic accelerator in an automobile which comprises: an ECU power potential stabilizing circuit which eliminates noise and stabilizes voltage variation occurring when electrical parts of an automobile are activated by the power supplied through the ECU of the electronic accelerator, by impressing it to the power supply line and variable voltage supply line; and an ECU reference potential stabilizing circuit which eliminates the unnecessary spark noise and harmonics noise occurring on the power supply line, reference potential line and variable voltage supply line, by impressing it to the variable voltage supply line and reference potential line. It further stabilizes the voltage supplied to the ECU by compensating the voltage fluctuated due to disturbances.

DETAILED DESCRIPTION

Figure 1:
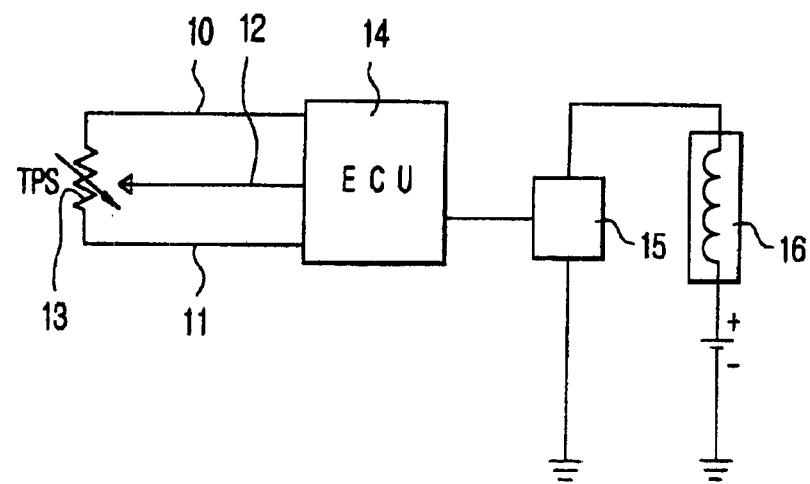
FIG. 1 is an illustrative drawing of the conventional electronic automobile accelerator.
Figure 2:
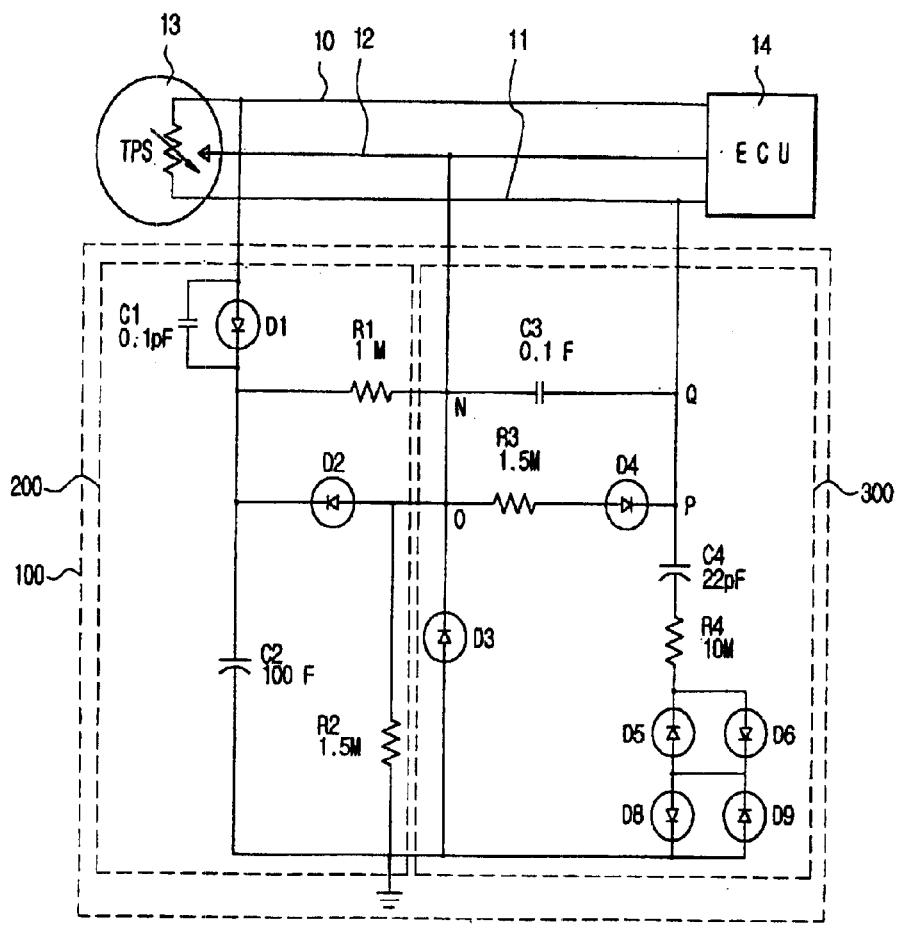
FIG. 2 is a circuit diagram of the present invention.

The functions and structure of the present invention as depicted in the drawings are as follows:As seen in FIG. 2, a variable voltage regulator (100) for an electronic accelerator in an automobile comprises; an ECU power potential stabilizing circuit (200) which eliminates noise transmitted from the power supply line (10) and stabilizes voltage fluctuation of the power supply line; and an ECU reference potential stabilizing circuit (300) which stabilizes noise and voltage fluctuations that occur between the reference potential line (11) and ground and between the variable voltage supply line (12) and the reference potential line (11).

Referring now to the circuit diagrams of the ECU power potential stabilizing circuit (200) and the ECU reference potential stabilizing circuit (300), a variable resistance (13) and a cathode of diode 1 (hereinafter to be called "D1") are connected in parallel with the power supply line (10). A capacitor (hereinafter to be called "C1") is connected in parallel to both ends of the D1, an anode of D1 is connected to the resistance (hereinafter to be called "R1"), the anode of diode 2 (hereinafter to be called "D2") is connected to capacitor 2 (hereinafter to be called "C2"), one end of the C2 is earthed, one end of the R1 is connected to the branch point "N" of the variable voltage supply line (12) and the cathode of D2 is connected to the branch point "O." The anode of diode 3 (hereinafter to be called "D3") and resistance 2 (hereinafter to be called "R2") are connected to the branch point "O" whereas the cathode of D3 is earthed to one end of the R2.

One end of capacitor 3 (hereinafter to be called C3) connected to the branch point "N" of the said variable voltage supply line (12) is connected to the branch point "Q" of the reference potential line, one end of the resistance 3 (hereinafter to be called "R3") connected to the branch point "O" of the said variable voltage supply line (12) is connected to the cathode of diode 4 (hereinafter to be called "D4") and the anode of D4 is connected to the branch point "P" of the said reference potential line (11). Finally, one line of C4 is connected to the branch point "P" of the reference potential line while the other one line is connected to the resistance 4 (hereinafter to be called "R4") and R4 is connected to the anode of diode 5 (hereinafter to be called "D5") and the cathode of diode 6 (hereinafter to be called "D6"). The cathode of D5 and the anode of D6 of the cathode connect the anode of the diode 7 (hereinafter to be called "D7") and the cathode of diode 8 (hereinafter to be called "D8") whereas the cathode of D7 and the anode of D8 are earthed.

The above ECU power potential stabilizing circuit (200) eliminates harmonics noise and spark noise transmitted to the said power supply line (10) by absorbing them to the earth through C1 and C2. The voltage supplied from the said power supply line (10) is connected to the variable resistance supply line through D1, R1 and the branch point "N." It is finally earthed through the R2 after it passed the branch point "O." Although the resisting value of the variable resister may vary according to the type of automobile and the manufacturer, the voltage supplied from the power supply line is 5V and the variable resister is 5k Σ in this case. The variable resister may vary between 0.5k Σ~5k Σ according to the variable locations of the variable resistance. R1 is 1M Σ and R2 is 1.5M Σ, and these are approximately 20~30 times the resistance value of the variable resister. And, their effect to the resistance value of the variable resister (13) is not considerable. However, by using the power voltage supplied through D1, they compensate part of the voltage reduced by the voltage drop caused by the use of highelectric systems such as airand lights and reduce the potential difference, occurred between the variable voltage line and earth, with R2 so that the voltage fluctuation on the variable voltage supply line (12) is suppressed and D1 interrupts the potential that may give an effect to the power supply line from the earth.

The power voltage supplied through D1 is charged by C2 whose capacity is 470 pF. When the supply voltage drops below the specific level due to a disturbance, C2 discharges through R1 and R2 and compensates the potential difference between the power supply line and the variable resistance voltage supply line to mitigate the abrupt increase of potential of the variable voltage supply line (12).

The potential difference between the earth and the said reference potential line (11) occurs within the range of 0.05~0.3V according to the use of such electric loads as automobile airand lights although this may differ according to the type of automobile. A noise created from other electric parts of an automobile is transmitted through the said reference potential line (11) and variable resistance voltage supply line.

According to such noise voltage, a higher voltage than the normal voltage of a reference throttle valve opening ratio is supplied to the ECU so that the said ECU transmits unnecessary pulse signals to the solenoid control unit, and the said solenoid opens to supply unnecessary gas to the engine.

Therefore, the ECU reference potential stabilizing circuit (300) eliminates the noise contained in the variable voltage supply line (12) and the reference potential line (11) by earth through the C3, C4, R4, D5, D6, D7 and D8 circuits. The noise created from the ECU is earthed and eliminated through the C3, C4, R4, D5, D6, D7 and D8 circuits that are connected to the reference potential line (11).

When the potential difference abruptly increases or decreases due to disturbance by the noise between the reference potential line (11) and earth, controlling the engine power becomes difficult because the RAM (Random Access Memory) of the ECU changes the memory data, responds to the voltage and quickly deletes and creates the data so that the pulse that controls the solenoid is not created. Therefore, abrupt voltage fluctuation caused by the noise between the reference potential line (11) and earth is properly controlled by the D5~D8.

Although the overall structure of the present invention is described above, the applications of the present invention are not limited to the above, but it may be applied in many different ways within the scope of the specifications, drawings and claims of the present invention.

In supplying the variable voltage to the ECU according to variations of the variable resistance of the electronic accelerator of an automobile, the present invention described above minimizes the effect on the voltage value inputted in the ECU, enables the driver to control the output of an automobile's engine by interrupting various electric noises, increases the riding comfort, increases mileage by preventing unnecessary burning of gas and reduces air pollution and extends the life of an automobile.

What is claimed is:

1. A variable voltage regulator for an electronic accelerator in an automobile, comprising:

an Electronic Control Unit (ECU) power potential stabilizing circuit connected between a power supply line and a variable voltage supply line to reduce the noise transmitted to the power supply line and to stabilize voltage fluctuations of the power supply line; and an ECU reference potential stabilizing circuit installed between the variable voltage supply line and the reference potential line to eliminate the noise occurring between the reference potential line and a ground, and between the variable voltage supply line and the reference potential line and to stabilize the potential fluctuation between the reference potential and a ground and the potential of the variable voltage supply line.

2. A variable voltage regulator in accordance with claim 1, wherein the said ECU power potential stabilizing circuit comprises:

a variable resister and a cathode of a first diode connected parallel to the power supply line; a first capacitor Cl connected to both ends of the first diode; the anode of first diode connected to the variable voltage supply line through the first resistance; a second resistance whose one end is grounded and the other is connected to the cathode of the a second diode; and the anode of a second diode grounded through the second diode which is connected to the anode of the first diode.

3. A variable voltage regulator in accordance of claim 1, wherein, on the variable voltage supply line and the reference potential line, the said ECU reference potential stabilizing circuit comprises: a third capacitor whose one end is connected to the anode of a fourth diode at a branch point; a cathode of said fourth diode which is connected to the anode of the third diode through the a third resistance; a fourth capacitance which is connected to one end of the third capacitor to the branch point where the anode of the fourth diode is also connected; one end of the fourth capacitor is connected to the anode of a fifth diode and the cathode of a sixth diode through the fourth resistance; the cathode of fifth diode and the anode of sixth diode are connected to each other and they are connected to the anode of a seventh diode and the cathode of an eighth diode again; and the cathode of the seventh diode and the anode of the eight are grounded.

* * * * *